F. E. RICE.

ANIMAL-TRAP.

No. 7,798. Reissued July 17, 1877.

Witnesses:
C. E. Remick.
A. W. Gates

Inventor:
Frank E. Rice,
by his attorney
A. S. Spencer

N. PETERS, PHOTO-LITHOGRAPHER, WASHINGTON, D. C.

UNITED STATES PATENT OFFICE.

FRANK E. RICE, OF LOWELL, MASSACHUSETTS.

IMPROVEMENT IN ANIMAL-TRAPS.

Specification forming part of Letters Patent No. 181,105, dated August 15, 1876; Reissue No. 7,798, dated July 17, 1877; application filed May 26, 1877.

*To all whom it may concern:*

Be it known that I, FRANK E. RICE, of Lowell, Massachusetts, have invented certain Improvements in Animal-Traps, of which the following is a specification:

This invention relates particularly to a folding setting-lever, and to devices for locking and unlocking the hinged ends of wire box-traps.

My invention consists in a setting-lever for animal-traps, adapted to be unfolded or extended for setting the trap, and to fold or shut within the limits of the end of the trap when sprung.

My invention also consists in a wire cage, having a hinged door, closed by a spring and automatically locked, in combination with a lever, serving to unlock and open the door and to set the trap, and adapted to drop down when the trap is sprung into a position coincident with and not projecting beyond the door.

My invention also consists in a wire cage, a hinged door, and an operating-spring, in combination with an automatic locking device, fastening the door in its closed position, and an unlocking device operating by the movement of the lever preparatory to setting the trap.

My invention also consists in certain details of construction and operation, hereinafter explained.

The common box-trap is a rectangular wire cage, having hinged doors at its end, closed by a spring, and frequently provided with a lock in some form; but this lock invariably requires special attention to unlock, being entirely distinct from the lever which opens the door. Again, in ordinary traps the lever, by which the door is opened, is a stiff double wire, projecting several inches above the top of the cage, making an extremely awkward article to pack, and exposing the protruding levers to injury.

In my trap the movement of the lever in opening the box automatically unlocks the door, and when locked the handle does not project at all. It is in these respects that I have sought to improve upon the traps now in use, and the annexed drawings represent in convenient form a trap embodying my improvements—

Figure 1:
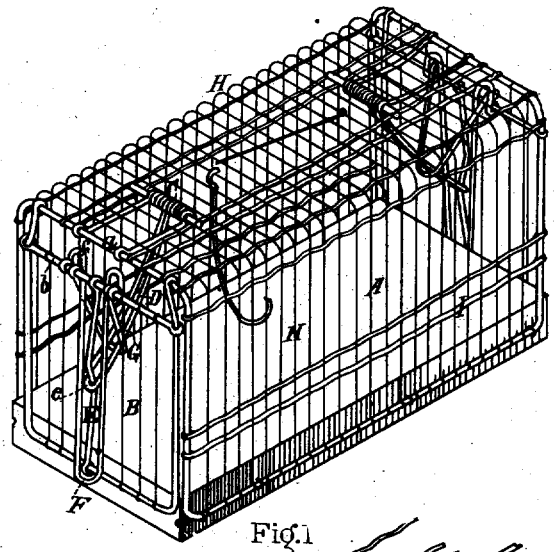
Figure 2:
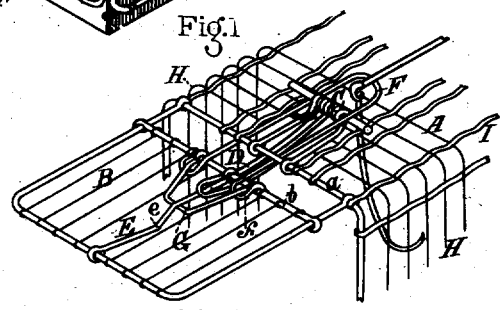

Figure 1 showing the cage locked and the lever folded, while Fig. 2 shows one end of the trap opened and set.

The description will be confined to the illustration shown, leaving other forms to the skill of the constructors.

A is the trap, and B one of the hinged doors. C is a coiled spring, secured to the top of the cage, and having formed integral with it the projecting loop D, by which its power is applied to a central bar, E, of the door B. The elasticity of the spring tends to close the door by depressing the bar to which its loop is attached. This bar is bent near its middle in reverse obtuse angles, to form a seat for the loop of the spring C when the trap is sprung. The loop D thus extends diagonally from the lower angle *e* of the central bar to the rod upon which the spring is coiled, and forms a simple and secure automatic lock, for that part of the bar E lying between its two angles is substantially perpendicular to the loop, and the tension of the spring tends to hold the loop in its seat *e*. While in this position the tenacity of the wire composing the loop D resists any outward pressure upon the door B. This double function of the spring-lock C D is a peculiar feature of my invention. The locking arrangement may be somewhat modified, if desired; but I consider the method described as the most convenient.

F is the lever for unlocking and setting the trap. It consists, preferably, of a wire, doubled as shown, and pivoted near its ends loosely upon a wire, *b*, of the door, located just beneath the one *a*, which forms the corner of the cage, and the fulcrum for the lever F. Before the lever bears upon this fulcrum to open the door, it releases the lock by a movement preliminary to that of setting the trap. The lever is formed with an inward prolongation or shoulder, *f*, adjoining its points of attachment to the door. When the lever is raised, preparatory to opening the trap, this shoulder presses against the key G, which is a wire bail pivoted by both its ends adjacent to the lever-pivots. Pressure of the shoulders *f* upon this key forces the extremity of the spring-loop D from its seat in the lower angle of the bar E backward and upward beyond the upper angle, thus unlocking the door and bringing the lever F to bear upon its fulcrum *a*, while its shoulders *f* press the key G against the inner surface of the door, which will thus be opened widely by bringing the lever into a horizontal position upon the top of the trap, where it is held in the usual way by a trigger-connection with the bait, as in Fig. 2. It is obvious that when the lever is released from this connection the spring will close the door, and the lock will automatically secure it, while the lever will be suspended loosely at the front of the door, so that neither end of it shall project beyond the corners of the trap.

I claim as my invention—

1. A setting-lever for animal-traps, adapted to be unfolded or extended for setting the trap, and to fold or shut when sprung within the limits of the end of the trap, substantially as and for the purposes set forth.

2. A wire cage having a hinged door, a spring, and an automatic-locking device, in combination with a lever, arranged to unlock and open the door and to set the trap, and adapted to drop down when the trap is sprung into a position, substantially coincident with and not projecting beyond the door, for the purpose set forth.

3. A wire cage having a hinged door and an operating-spring, in combination with a locking device, adapted to operate automatically when the trap is sprung, and an unlocking device, which serves to unfasten the door by a movement of the lever used in setting the trap, substantially as set forth.

4. The combination, with the trap A and hinged door B, provided with the bent bar E, of the spring-loop C D, having the double function herein described.

FRANK E. RICE.

Witnesses:

A. H. SPENCER,

C. G. KEYES.